Feb. 17, 1970　　TOSHIHIKO TAKAGI ET AL　　3,495,518
PHOTOGRAPHIC CAMERA DEVICE

Filed July 27, 1966　　　　　　　　　　　　　　5 Sheets-Sheet 1

INVENTOR.
Toshihiko Takagi
Takashi Yamazaki

BY　　　　　　　　ATTORNEYS

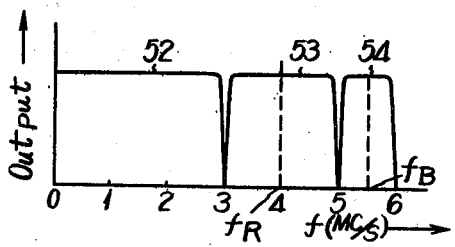
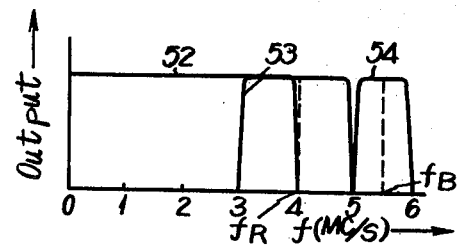
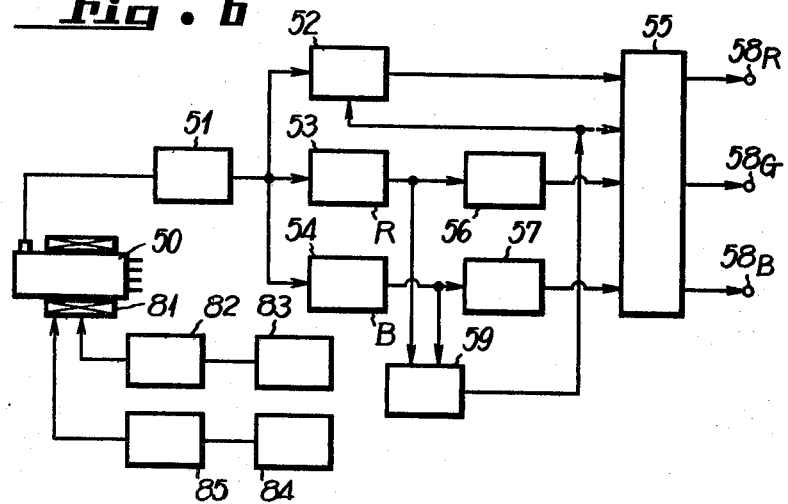
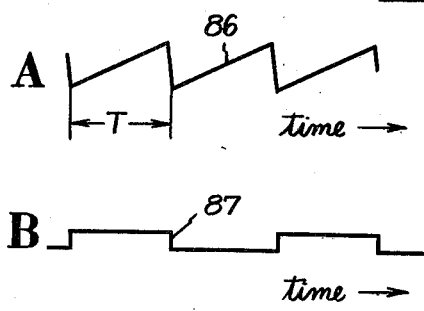
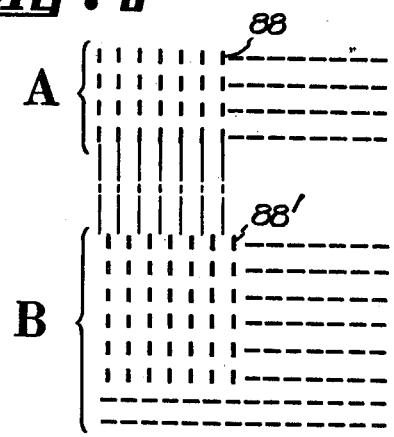
INVENTOR.
Toshihiko Takagi
Takashi Yamazaki
BY　　　　　　　　　　ATTORNEYS

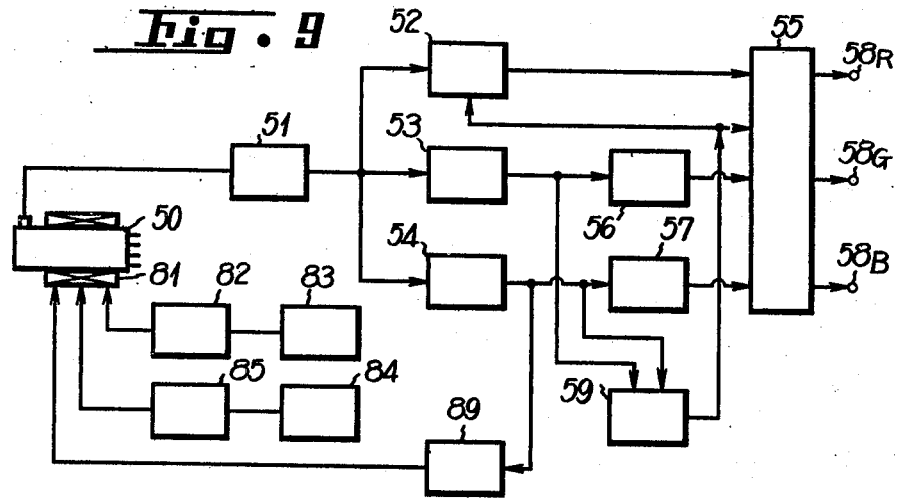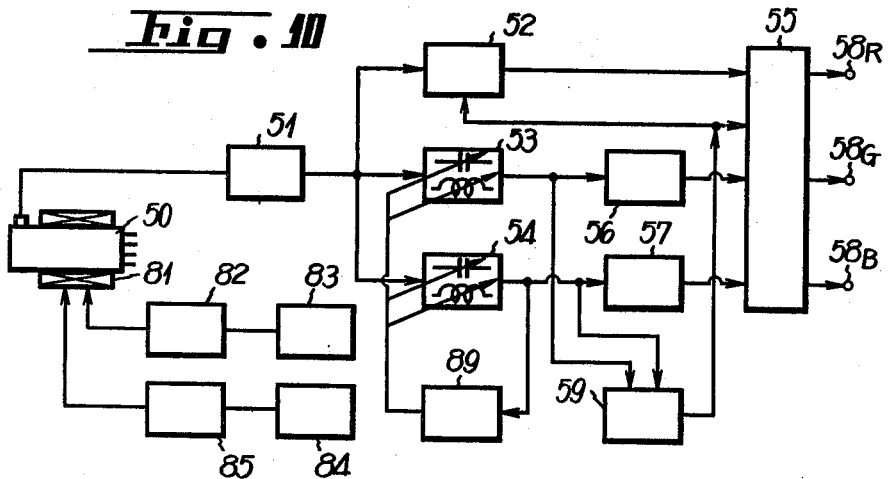

Feb. 17, 1970 TOSHIHIKO TAKAGI ET AL 3,495,518
PHOTOGRAPHIC CAMERA DEVICE
Filed July 27, 1966 5 Sheets-Sheet 4
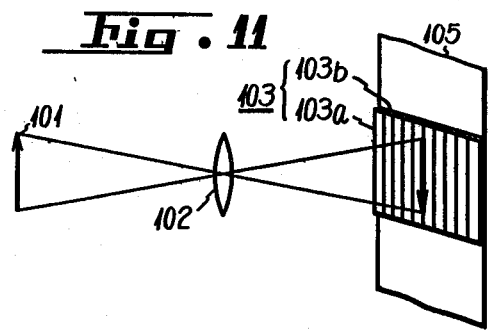
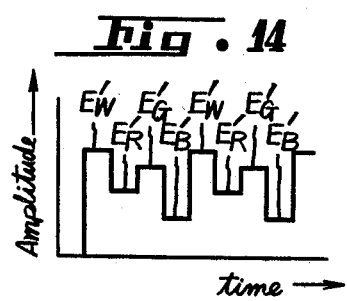
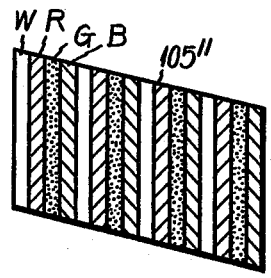
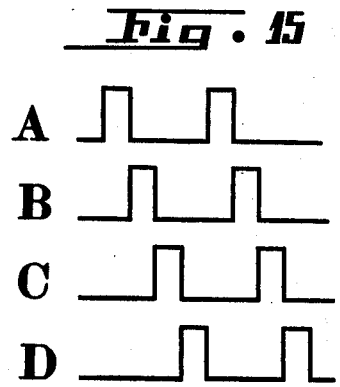
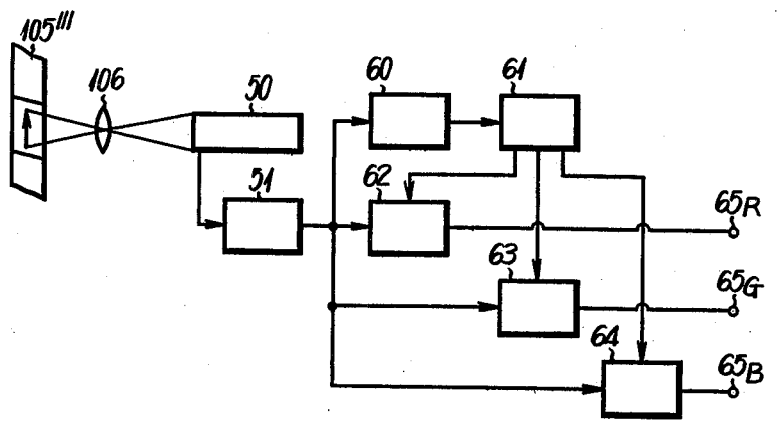
INVENTOR.
Toshihiko Takagi
Takashi Yamazaki
BY *[signature]* ATTORNEYS

United States Patent Office 3,495,518
Patented Feb. 17, 1970

3,495,518
PHOTOGRAPHIC CAMERA DEVICE
Toshihiko Takagi and Takashi Yamazaki, Kawasaki-shi, Kanagawa-ken, Japan, assignors to Nippon Columbia Kabushikikaisha (Nippon Columbia Co., Ltd.), Minato-ku, Tokyo, Japan, a corporation of Japan
Filed July 27, 1966, Ser. No. 572,642
Int. Cl. G03b *33/14*
U.S. Cl. 95—12.21
3 Claims

ABSTRACT OF THE DISCLOSURE

A camera apparatus for reproducing a color picture on monochromatic film with stripe patterns of filters thereon. Filters are placed in the light path of the camera and the stripe patterns correspond to the primary color components of the object. The monochromatic film is utilized in a television system having structure for scanning a beam transverse to the direction of the stripe. The scanning beam produces an electrical signal which can be detected to recover the color information for reproduction of the original.

---

This invention relates to a photographic camera device for obtaining a monochrome photographic film having recorded thereon color information, more particularly a photographic monochrome film for use in television tansmission.

It has been the practice in the art to employ the so-called color film for color image reproduction in a television transmitter. As is well known, however, the color film is very expensive and its development requires considerably complicated processes, as compared with the monochrome film.

Accordingly, it is a primary object of this invention to provide a novel photographic camera device capable of furnishing a monochrome film with color information.

It is another object of this invention to provide a photographic camera device in which stripe patterns of different pitches dependent upon primary color components of an object to be televised are recorded on a monochrome film, simultaneously with recording of an image of the object, thereby obtaining monochrome photographic film having contained therein color information and an image of an object to be televised.

It is still another object of this invention to provide a photographic camera device in which stripe patterns of different pitches corresponding to at least three primary color components of an object to be televised or recorded on a monochrome film, simultaneously with recording of the object, thereby producing a photographic film for television transmission use.

Briefly stated, the present invention resides in the provision of a photographic camera having a filter consisting of one or more filter components each comprising more than two kinds of strip filter elements sequentially arranged alternately, one kind of the strip filter elements being capable of transmitting light of substantially all colors, each of the other kinds of strip filter elements being capable of intercepting light of one color different from those cut off by the other strip filter elements, and the filter being disposed in the light path at such a location as to be optically adherent to the sensitive surface of a monochrome film or at a location equivalent thereto.

Other objects, features and advantages of this invention will be apparent from the following description taken in conjunction with the accompanying drawings, in which:

FIGURE 1 is a diagram schematically illustrating one example of a photographic camera device according to this invention;

FIGURES 2A and 2B respectively illustrate a filter component employed in this invention;

FIGURE 4 is a diagrammatic showing of frequency characteristic of filters used in the example of FIGURE 3;

FIGURE 5 illustrates a similar frequency characteristics of the filters but partly overlapping;

FIGURE 6 illustrates in block another example of the color signal generating device according to this invention;

FIGURES 7A and 7B show waveforms of currents employed in the example of FIGURE 6;

FIGURES 8A and 8B are explanatory diagrams for the example shown in FIGURE 6;

FIGURE 9 is a block diagram illustrating still another example of the color signal generating device according to this invention;

FIGURE 10 is a block diagram, similar to FIGURE 9, illustrating a further example of the color signal generating device according to this invention;

Figure 19:
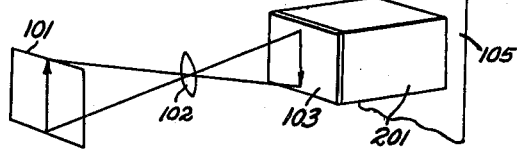
Figure 16:
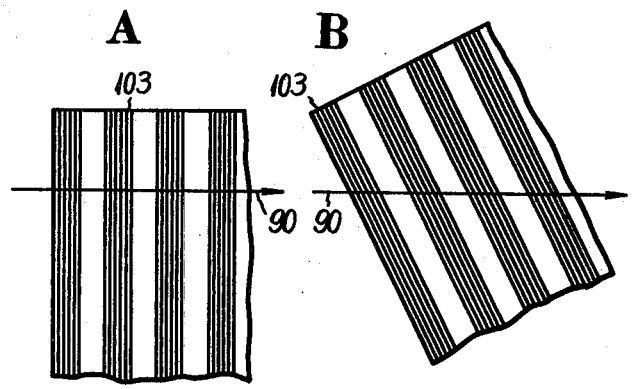
Figure 17:
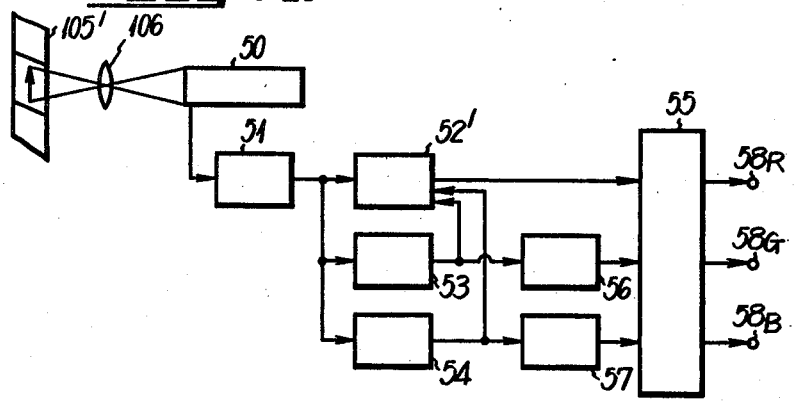
Figure 18:
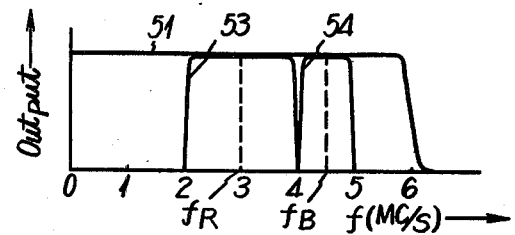

FIGURE 11 schematically illustrates another example of the photographic camera device according to this invention;

FIGURE 12 diagrammatically shows another example of the filter used in the photographic camera system of this invention;

FIGURE 13 illustrates in block one example of the color signal generating device of this invention having incorporated therein the filter depicted in FIGURE 12;

FIGURE 14 is a schematic diagram showing an output waveform produced in the example shown in FIGURE 13;

FIGURES 15A to D, inclusive, are waveform diagrams, A showing a waveform obtained from that depicted in FIGURE 13 and B, C and D gate pulses;

FIGURES 16A and 16B diagrammatically show filters, for explaining this invention;

FIGURE 17 is a block diagram showing another example of the color signal generating device of this invention;

FIGURE 18 illustrates frequency characteristics of filters employed in the example depicted in FIGURE 17; and FIGURE 19 illustrates a fiber optic arrangement.

As is well known in the art, reproduction of lights of various colors requires lights of at least three colors or the so-called three primary colors. In order to facilitate a better understanding of this invention, a description will now be given in connection with reproduction of color lights from an object to be televised by mixing the so-called three primary colors.

Figure 1:
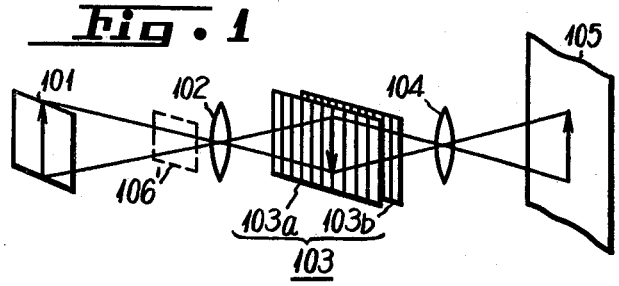

In FIGURE 1, there is illustrated one example of the fundamental construction of a photographic camera of this invention. Reference numerals 101 indicates an object to be televised, 102 an objective lens, 103 an optical filter comprising filter components 103a and 103b which in turn consist of strip filter elements, the optical filter being disposed on a focusing plane on which the object 101 is focused into an image through the objective lens 102. Reference numeral 104 identifies a relay lens which projects to an unexposed monochrome film the real image focused on the focusing plane. For the sake of brevity, an iris diaphragm, a film feeding mechanism and so on are left out which are not necessary for explaining the principles of this invention. Further, the camera mentioned herein is inclusive of still and motion picture cameras. The unexposed monochrome film 105 after exposed to light is subjected to necessary processings and then is projected, by suitable means described later, to a television transmitting apparatus of a circuit construction which features this invention.

Figure 2:
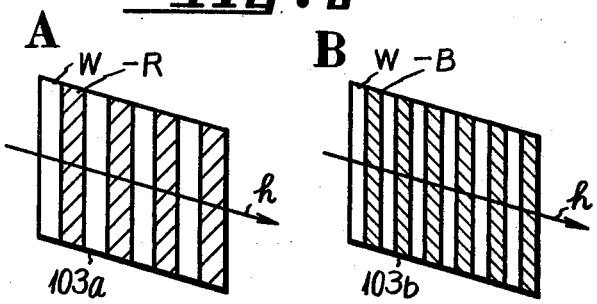

The optical filter 103 consists of the filter components 103a and 103b, each having a construction such as depicted in FIGURE 2. That is, the filter component 103a comprises two kinds of strip filter elements W and —R arranged alternately and sequentially in the longitudinal direction thereof, the strip filter elements W being capable of transmitting light of substantially all wavelengths of visible rays and the strip filter element —R being capable of intercepting a certain color light, for example, red. The width of the filter elements W and —R can be selected as desired. The total width of a pair of adjacent strip filter elements W and —R is referred to as a "pitch" in this specification. The arrangement and the pitch of the strip filter elements W and —R of the optical filter component 103a are selected such that when the image of the object 101 on the film 105 is projected to a photoelectric conversion device, the stripe pattern of the filter component 103a may cross the horizontal scanning direction $h$ of the photo-electric conversion device so as to produce video signals having a carrier frequency $f_R$. The filter component 103b comprises two kinds of strip filter elements W and —B arranged alternately and sequentially in a manner similar to the aforementioned elements W and —R, the strip filter elements W being the same as those mentioned above but the strip filter elements —B being capable of intercepting light of a certain color such, for example, as blue which differs from the color cut off by the strip filter elements —R. The arrangement and the pitch of these strip filter elements W and —B are selected such that when the image of the object 101 on the film 105 is projected to the photoelectric conversion device, the stripe pattern of the filter component 103b may intersect the horizontal scanning direction $h$ of the photoelectric conversion device to produce video signals having a carrier frequency $f_B$.

With such an arrangement, when the object 101 is focused into an image on the filter 103 by the objective lens 102, the filter component 103a cuts off red light only, radiated from the object 101, in such a stripe pattern as to produce the video signal having the frequency $f_R$ and similarly the filter component 103b cuts off only blue light in such a stripe pattern as to produce the video signal frequency $f_B$. The filter component 103a does not exert any influence on light of all colors except red and the other filter component 103b does not effect light of all colors except blue.

Therefore, the picture image on the film 105, which is obtained by a camera having such a construction as shown in FIGURE 1, is converted into a video signal E, as theoretically expressed by the following equation:

$$E=(E_W-k_R E_R-k_B E_B)-K_R E_R \cos \omega_R t \\ -K_B E_B \cos \omega_B t \quad (1)$$

In this Equation 1, $E_W$ represents a video signal corresponding to all visible light, $E_R$ and $E_B$ video signals corresponding to red and blue lights respectively, $k_R$ and $k_B$ constants dependent upon duty cycles of the stripe patterns of the filter components and spectral sensitivity of the film, and $K_R$ and $K_B$ constants dependent upon the above duty cycles spectral sensitivity and resolution characteristic of the system. In order to clarify the principles, higher harmonic components of $\omega_R$ and $\omega_B$ have been omitted.

Figure 3:
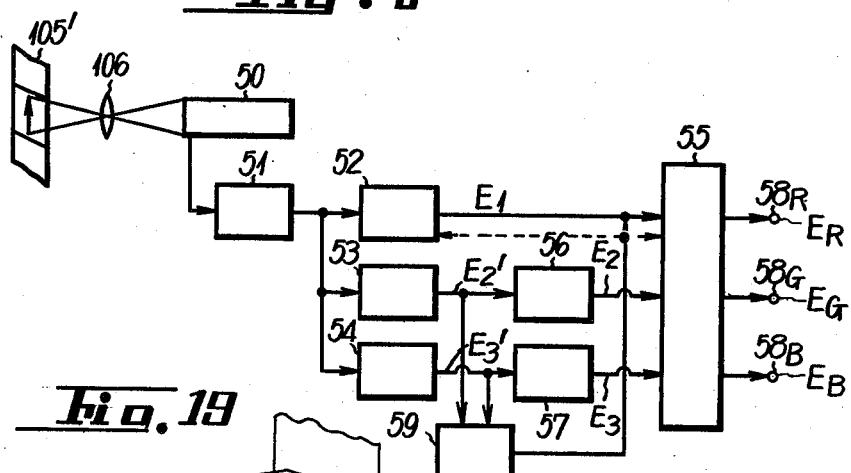
FIGURE 3 is a block diagram illustrating one example of a color signal generating device according to this invention.

Now, a description will be given in connection with a system for producing color television signals from the film thus obtained. In FIGURE 3, reference numeral 105' designates a film obtained by processing the unexposed film 105, and the image on the film 105' is projected through a lens 106 to the photoelectric conversion layer of a pickup tube 50. Reference numeral 51 identifies an amplifier for amplifying the output of the pickup tube 50. The pickup tube 50 and the amplifier 51 may be constructed in substantially the same manner as those for usual monochrome television cameras. It will appear from the foregoing that the output of the amplifier 51 includes such a video signal as given by the Equation 1.

The output of the amplifier 51 is fed respectively to a low-pass filter 52, a band-pass filter 53 having a center frequency $f_R$ and another band-pass filter 54 having a center frequency $f_B$. The characteristics of the filters 52, 53 and 54 are as illustrated in FIGURE 4. The low-pass filter 52 serves to select the first term of the Equation 1 and its output $E_1$ is a non-carrier signal such as given by the following equation.

$$E_1 = E_W - k_R E_R - k_B E_B \quad (2)$$

The band-pass filter 53 serves to select the second term of the Equation 1 and its output $E_2'$ is a carrier signal such as given by the following equation.

$$E_2' = K_R E_R \cos \omega_R t \quad (3)$$

the band-pass filter 54 serves to select the third term of the Equation 1 and its output $E_3'$ is a carrier signal such as expressed by the following equation.

$$E_3' = K_B E_B \cos \omega_B t \quad (4)$$

Reference numerals 56 and 57 indicate detectors, which detect the outputs of the band-pass filters 53 and 54 respectively. Then, the outputs $E_2$ and $E_3$ of the detectors 56 and 57 are as follows:

$$E_2 = K_R E_R \quad (5)$$
$$E_3 = K_B E_B \quad (6)$$

Reference numeral 55 identifies a matrix circuit for computing the outputs $E_1$ of the low-pass filter 52 given by the Equation 2 and the outputs $E_2$ and $E_3$ of the detectors 56 and 57 given by the Equations 5 and 6 respectively.

Generally, $E_W$ is given as follows:

$$E_W = a E_R + b E_G + c E_B \quad (7)$$

Hence, signals $E_R$, $E_G$ and $E_B$ can be obtained respectively at output terminals 58R, 58G and 58B of the matrix circuit 55. In the Equation 7 $a$, $b$ and $c$ represent constants dependent upon wavelength sensitivity of the film 105 and so on. If necessary, it is possible to dispose a color optical filter 106' shown in dotted line in the optical path of the camera shown in FIGURE 1, so as to change the values of the constants $a$, $b$ and $c$ and the aforementioned constants $K_R$ and $K_B$.

The principles of this invention will be understood from the foregoing, but some additional matters will hereinbelow be described.

There is often produced in the output of the amplifier 51 a beat frequency between $\omega_R$ and $\omega_B$ due to cross modulation which results from non-linear characteristics present in the pickup tube 50, the amplifier 51 and the like. Of the beat frequency components, a particular component given by the following equation is contained, in practice, in the pass band of the low-pass filter 52 illustrated in FIGURE 4 and these beat frequency component appears of the low-pass filter 52 in the form of an unnecessary signal, $$K E_R E_B \cos (\omega_B - \omega_R) t \quad (8)$$

where K is a constant. To avoid this unnecessary signal, a beat frequency generator 59 is provided, to which are applied the outputs of the bandpass filters 53 and 54, namely the carrier components $E_2'$ and $E_3'$ expressed by the Equations 3 and 4, thereby producing a beat frequancy component such as follows:

$$-K E_R E_B \cos (\omega_B - \omega_R) t \quad (9)$$

The beat output thus produced is added to the output of the low-pass filter 52, which results in cancellation of the unnecessary signal contained in the output of the low-pass filter 52 and given by the Equation 8.

A description will hereinafter be made, in connection with an embodiment of the bandwidth of a video signal which is reduced into its color components.

It is known that the visual color charactistic has a maximum resolution for monochrome information and that the resolution varies with the chromaticity of color information. Accordingly, if a bandwith of 3 mc./s., the broadest one in FIGURE 4, is given to the filter 52 for obtaining the signal $E_1$ of the Equation 2 from the signals of the Equation 1, a bandwith of 2 mc./s. ($\pm 1$ mc./s.) is given to the filter 53 for obtaining a red color signal of a relatively high resolution, namely the signal $E_2$( of the Equation 3, and a bandwith of 1 mc./s. ($\pm 0.5$ mc./s.) is given to the filter 54 for obtaining a blue color component voltage of a relatively low resolution, the center frequencies $f_R$ and $f_B$ of the filters 53 and 54 become 4 mc./s. and 5.5 mc./s. respectively.

FIGURE 5 illustrates the case in which when the entire bandwidth is 6 mc./s., a high apparent resolution is to be obtained in the same manner as in FIGURE 4. That is, the upper limit frequency of the band of the filter 52 is raised approximately up to the center frequency $f_R$ of the filter 53 and the bandwidth of the filter 52 is set at about 4 mc./s. The bandwidths of the other filters 53 and 54 are the same as in FIGURE 4. It will be apparent that the bandwidth of the filter 52 is extended while the bandwidths of the filters 53 and 54 may be further narrowed so as particularly to effect omission of color information of details.

It is useful, in enhancing an apparent resolution, to overlap one portion of the band of the filter 52 in the band of the filter 53 as described above referring to FIGURE 5. However, the component of the filter 53 gets mixed in the output voltage $E_1$ of the filter 52 and, as a result of this, a stripe pattern due to $f_R$ appears in the reproduced picture and becomes a harmful component.

Referring now to FIGURES 6 and 7, a description will be given in connection with means for removig such a harmful component. In FIGURE 6 there is illustrated an example in which the circuit of FIGURE 3 has incorporated therein an additional circuit for preventing occurrence of the harmful component. In this figure parts corresponding to those in FIGURE 3 are identified at the same reference numerals and no further explanation will be made. The pickup tube 50 is illustrated having a horizontal deflection coil 81. The horizontal deflection coil 81 has connected thereto a horizontal deflection output circuit 82 as usual, which is driven by a horizontal synchronizing signal circuit 83 in synchronism therewith. Reference numeral 84 indicates a vertical synchronizing circuit for a vertical deflection coil (not illustrated) of the pickup tube 50.

In order to eliminate the harmful component resulting from the stripe pattern due to $f_R$ appearing in the reproduced picture, there is provided a circuit 85 which is driven by the output of the vertical synchronizing signal circuit 84 and produces a rectangular current shown in FIGURE 7B. This output of the circuit 85 is applied to, for example, the horizontal deflection coil 81, being superimposed on the horizontal deflection output of the circuit 82. The rectangular signal will be apparent from the following description. In FIGURE 7A, there is illustrated in the form of a sawtooth current 86 the output current which is fed to the vertical deflection coil from the vertical deflection output circuit (not illustrated) which is driven by the vertical synchronizing signal circuit 84. The period T of the sawtooth current is equal to that of one field of the reproducing device or the pickup tube. The rectangular current 87, which is produced by the circuit 85 as shown in FIGURE 7B, turns "on" and "off" every field period T of the vertical synchronizing signal. This is a rectangular current. It will be seen that addition of the rectangular current to the horizontal deflection coil 70 causes the picture of one field to shift in a horizontal direction. Therefore, the amplitude of this rectangular current is determined such that the stripe patterns will appear interleaved between adjacent ones of the other field, being shifted in the horizontal direction approximately half pitch of the stripe patterns. That is, if the stripe patterns 88 such as illustrated in FIGURE 8A appear in the duration of one field during which the rectangular signal 87 is off to the horizontal deflection coil 81, the distance of the shift of the stripe pattern of the following field is determined such that the stripe patterns 88' appear between adjacent stripe patterns 88 as illustrated in FIGURE 8B. The distance of the shift is usually selected such that the stripes 88' of the following one field appear between the adjacent stripe pattern 88 of the preceding field. Thus, the positions of the stripe patterns of each field in the reproduced picture are not fixed to an observer, and hence the effect of the stripe pattern can be effectively reduced. With reference to FIGURES 6 and 8 the foregoing has been given in connection with the rectangular current generating circuit which is driven by a vertical synchronizing signal. However, the same results can be produced in a different manner. That is, the rectangular current generating circuit 85 is driven by the horizontal synchronizing signal circuit 83, producing a rectangular current. The period of thus obtained rectangular current is made to agree with that of the horizontal deflection current. Its amplitude is determined to be such a value as mentioned above and its phase is inverted every vertical deflection period. In addition, it is also possible to apply a rectangular current to another coil provided around the pickup tube 50, without being restricted to the case where the rectangular current is fed to the horizontal deflection coil. Furthermore, in the case where the pickup tube is of an electronic deflection type, the aforementioned unnecessary component may essentially be cut off by applying the rectangular voltage to a deflection plate. It is also possible to feed a rectangular current to a reproducing device, namely the receiver pickup tube, without being limited to the above case of application of the rectangular current to the deflection means of the receiver pickup tube.

Further, there are provided means for cutting off the variations in $f_R$ and $f_B$ which are added to or obtained from the filters 53 and 54 in FIGURE 3. With variations in the horizontal scanning amplitude or linearity of a signal from the horizontal deflection output circuit 82 in FIGURE 6, there are caused deviations in the frequencies $f_R$ and $f_B$ of the signals applied to the filters 53 and 54. As a result of this, the frequencies exceed the bandwidths of the filters 53 and 54 or the characteristics within their bandwidths become uneven. This results in distortion of the reproduced picture and deterioration of picture quality. To avoid this, in the circuit of, for example, FIGURE 6 the output of either one of the filters 53 and 54 (the filter 54 in this figure) is applied to a frequency discriminator 89, as illustrated in FIGURE 9, thereby discriminating the deviations in the frequency $f_B$. Thus discriminated output is then fed to, for example, the horizontal deflection coil 81 of the pickup tube 50. In this figure parts corresponding to those in FIGURE 6 are designated at the same reference numerals for the sake of brevity. In this case, it is of course possible to apply the output of the discriminator 89 to the horizontal synchronizing circuit or to the horizontal deflection output circuit 82. It is a matter of course to apply the output of the discriminator in such a direction as to cancel the deviations in the frequency component which is obtained in the pickup tube.

In place of this, other means can be employed for achieving the purpose. That is, it discriminates the deviations in the frequency components applied to the filters 53 and 54, as described above with FIGURE 9, thereby changing the electrical constants of the filter 53 and/or the filter 54. Consequently, the center frequency of the filter 53 and/or the filter 54 is altered in response to the shift of the center frequency of the signal applied to the filters 53 and/or the filter 54, and hence the signal can be accurately passed over the entire bandwidth. Therefore, it is possible to provide the filter 53 and/or the filter 54 with a variable element such, for example, as a variable inductance or capacitor, as illustrated in FIGURE 10, and its moving element is controlled by the output of the discriminator. In some cases, the band of the filter 52 can be made variable.

In FIGURE 11 there is illustrated an example of the photographic camera device of this invention, different from that shown in FIGURE 1. In FIGURE 1, it is regarded that the plane of the optical filter 103 is made to be substantially in close contact with the sensitive surface of the film 105 by the relay lens 104. Therefore, the film 105 can be located in direct contact with the optical filter 103 immediately behind it, as illustrated in FIGURE 11, so that the relay lens 104 may be left out. Further, it will be apparent that with the use of an optical image transmitter such as an optical fibre, the film 105 can be placed at such a location as to equal to that immediately behind the filter 103. Thus, the relay lens 104 such as shown in FIGURE 1 can be omitted, so that the entire photographic camera device can be simplified.

FIGURE 12 illustrates an optical filter 105″ which can be substituted for the aforementioned optical filter 103. As clearly seen from the figure, the optical filter comprises four different strip filter elements W, R, G and B sequentially arranged in a manner similar to that in FIGURE 2, the strip filter elements W being capable of transmitting visible light of all colors, the strip filter elements R being capable of transmitting light of one color, for example, red, the strip filter elements G being capable of transmitting light of a different color, for example, green, and the strip filter elements B being capable of transmitting light of a color different from the aforementioned ones, for example, blue.

FIGURE 13 illustrates in block a color video signal generating device, for use with a film having recorded thereon real images of an object to be televised and the stripe patterns of such as optical filter described previously. Reference numerals 106, 50 and 51 indicate a lens, a pickup tube and an amplifier which are substantially the same as those in FIGURE 1. Reference numeral 105‴ identifies a film which has an real image of an object to be transmitted and the stripe pattern of the optical filter 105″. In this case, the amplifier 51 produces such an output as illustrated in FIGURE 14, which is composed of time-division signals $E_W'$, $E_R'$, $E_G'$ and $E_B'$ corresponding to the strip filter elements W. R. G and B of the optical filter 105″ depicted in FIGURE 12.

In FIGURE 13 reference numeral 60 designates a waveform separating circuit which separates the output $E_W'$ from the waveform shown in FIGURE 14 and produces a waveform depicted in FIGURE 15A, just like a synchronizing signal separating circuit of a conventional television receiver. Reference numeral 61 indicates a multiphase pulse generator, which has applied thereto the pulse shown in FIGURE 15A and produces gate pulses such as illustrated in FIGURES 15B, 15C and 15D. These pulses are fed to gate circuits 62, 63 and 64 respectively, thereby opening them. At the same time, the output of the amplifier 51 applied respectively to them is gated. As a result of this, the outputs of the gate circuits 62, 63 and 64 are proportionate to those $E_R'$, $E_G'$ and $E_B'$ shown in FIGURE 14. That is, there are obtained at terminals 65R, 65G and 65B outputs in proportion to the aforementioned outputs $E_R'$, $E_G'$ and $E_B'$, thus achieving the desired purpose.

With the above device, however, there is a possibility that when detail components resembling the pitch of the striped filter are present in the image picture of an object to be televised, a moire pattern is produced in the reproduced picture on the receiver screen. To avoid this, it is preferred to locate in the light path between the optical filter and the object to be televised an optical element 106′ capable of limiting the resolution for the object, such as, for example, a glass plate having a suitable rough surface and it is also possible to shift the focusing lens to obtain a vignetted picture.

In order to change the ratio of each color component of the real imaged focused on the film 105, it is possible to employ means for changing the duty cycle of the stripe-patterned filter.

In the photographic camera depicted in FIGURE 1, the pitch of the filter to be located in front of or on the film 105 is selected such that the center frequencies of the bandpass filters 53 and 54 are of the aforementioned values. In some cases, however, it is required to change the bandwidths and center frequencies. This may be accomplished by changing the pitch of the optical filter. However, it is difficult in practice to change the pitch of the optical filter as desired at any time and in addition it is quite impracticable to change the pitch by small amounts. Therefore, means is required for changing center frequencies of the bands without changing the pitch of the optical filter. For this purpose, the filter is disposed in such a manner that the longitudinal direction of the strip filter elements differs from that shown in FIGURE 16A, relative to the direction of the horizontal scanning of an electron beam as illustrated in FIGURE 16B. In such a case, the relative velocity of the horizontal scanning by the electron beam identified at 90 is different from that in FIGURE 16A, and if this difference is predetermined according to the center frequency of the bandpass filter, thereby achieving the purpose.

FIGURE 17 illustrates another example of the color signal generating device of this invention, in which reference numerals 105′, 106, 50, 51, 53, 54, 55, 56 and 57 indicate the same elements as those in FIGURE 12. The feature of the device in FIGURE 17 lies in the provision of an adding circuit 52′. It is apparent that bandwidth of the amplifier 51 includes those of the filters 53 and 54 as shown in FIGURE 18. Since the outputs of the filters 53 and 54 are as given by the Equations 3 and 4, the outputs are applied to the adding circuit 52′ before being fed to the detectors 56 and 57 and the outputs and that of the amplifier 51 given by the Equation 1 are added together. At this time, the polarities and amplitudes of the outputs of the bandpass filters are determined in such a manner that the corresponding components contain in the outputs of the filters 53 and 54 and the amplifier 51, namely the second and third terms of the Equation 1 may be cancelled. Thus, the adding circuit 52′ may perform the function of the low-pass filter in FIGURE 3, and further frequency components exceeding the pass bands of the filters 53 and 54 can be obtained, so that resolution can be enhanced. It is, of course, possible in this example to use various additional means described with the system shown in FIGURE 3.

FIGURE 19 illustrates a fiber optics element 201 mounted between the optical filter 103 and film 105. The fiber optics element 201 transfers the light energy between the filter and film.

It will be apparent that many modifications and variations may be effected without departing from the scope of the novel concepts of this invention.

What we claim is:
1. Apparatus for producing monochromatic film from color images which can be utilized in a television system having means for scanning a beam in a particular direction to reproduce electrical signals containing color information comprising, an optical system through which said color images are passed, an unexposed monochromatic film for recording the focused real image of an object produced by said optical system, an optical filter in said optical system between said monochromatic film and color images and said filter formed of two filter elements with the first filter element comprising a first plurality of strips of equal width capable of passing visible light of all wavelengths and a second plurality of strips of equal width alternately spaced between said first plurality of strips and capable of intercepting visible light of sub- stantially one color, the second filter element comprising a third plurality of strips of equal width capable of passing visible light of all wavelengths and a fourth plurality of equal width strips alternately spaced between said third plurality of strips and capable of intercepting visible light of substantially one color which is different from said color intercepted by said second plurality of strips, the combined widths of one of the first plurality of strips and of the second plurality of strips being different from the combined widths of one of said third plurality of strips and one of said fourth plurality of strips, said first, second, third and fourth plurality of strips extending in the same direction, and the orientation of said scanning beam, said filter and said monochromatic film being such that when said monochromatic film has been exposed and developed said scanning beam traverses on each scanning pass across the portions of said film which were exposed through each of said first, second, third and fourth plurality of strips of said filter elements.

2. Apparatus according to claim 1 wherein the orientation of said scanning beam, said filter and said monochromatic film being such that said scanning beam traverses the portions of said film which were exposed through each of said first, second, third and fourth plurality of strips of said filter elements at substantially a right angle.

3. Apparatus according to claim 1 wherein the orientation of said scanning beam, said filter and said monochromatic film being such that said scanning beam traverses the portions of said film which were exposed through each of said first, second, third and fourth plurality of strips of said filter elements at substantially 45°.

References Cited

UNITED STATES PATENTS

| | | | |
|---|---|---|---|
| 1,749,278 | 3/1930 | Frederick | 88—16.4 |
| 2,203,651 | 6/1940 | Capstaff | 95—12.21 |
| 2,733,291 | 1/1956 | Kell. | |
| 2,907,817 | 10/1959 | Teer. | |
| 3,142,235 | 7/1964 | Siegmund. | |
| 2,047,282 | 7/1936 | Miller | 355—34 |

NORTON ANSHER, Primary Examiner

L. H. McCORMICK, Jr., Assistant Examiner

U.S. Cl. XR

178—5.4; 355—32